(12) United States Patent
Löytynoja et al.

(10) Patent No.: US 8,499,159 B2
(45) Date of Patent: Jul. 30, 2013

(54) METHOD AND SYSTEM EMBEDDING A NON-DETECTABLE FINGERPRINT IN A DIGITAL MEDIA FILE

(75) Inventors: Mikko Löytynoja, Oulu (FI); Marko Brockman, Oulu (SE); Jukka Koutaniemi, Oulu (SE); Eero Seppänen, Oulu (SE)

(73) Assignee: Capricode Oy, Oulu (FI)

( * ) Notice: Subject to any disclaimer, the term of this patent is extended or adjusted under 35 U.S.C. 154(b) by 0 days.

(21) Appl. No.: 13/180,930

(22) Filed: Jul. 12, 2011

(65) Prior Publication Data
US 2012/0011592 A1   Jan. 12, 2012

Related U.S. Application Data

(63) Continuation of application No. PCT/FI2009/000014, filed on Jan. 13, 2009.

(51) Int. Cl.
*G06F 21/00* (2006.01)

(52) U.S. Cl.
USPC ............................................ 713/176; 726/32

(58) Field of Classification Search
None
See application file for complete search history.

(56) References Cited

U.S. PATENT DOCUMENTS

| | | | |
|---|---|---|---|
| 2001/0044899 A1 | 11/2001 | Levy | |
| 2001/0053237 A1 | 12/2001 | Hashimoto | |
| 2003/0202659 A1* | 10/2003 | Rodriguez | 380/201 |
| 2008/0226121 A1* | 9/2008 | Tewfik et al. | 382/100 |

FOREIGN PATENT DOCUMENTS

| | | |
|---|---|---|
| EP | 0891071 A2 | 1/1999 |
| EP | 1189372 A2 | 3/2002 |
| EP | 1215907 A2 | 6/2002 |

OTHER PUBLICATIONS

Mikko Löytynoja, Nedeljko Cvejic, Tapio Seppän, Audio Protection with Removable Watermarking, IEEE ICICS, 2007, pp. 1-4, Department of Electrical Engineering, University of Oulu, Finland, Department of Electrical and Electronic Engineering, University of Bristol, United Kingdom.
Brockman Marko, "Audio Protection with Removable Watermarking for Mobile Distribution," (2009) pp. 1-62.
Office Action dated Apr. 9, 2013 from European Patent Application 09 838 178.3.

* cited by examiner

*Primary Examiner* — Gilberto Barron, Jr.
*Assistant Examiner* — Malcolm Cribbs
(74) *Attorney, Agent, or Firm* — Volpe and Koenig, P.C.

(57) ABSTRACT

The invention relates to a method and system for embedding in a digital media file user fingerprint which the user cannot detect when using the digital media file. In the method, a user-detectable watermark is first embedded in the digital media file. This watermark can be transformed in a client device to a non-detectable fingerprint of the user by utilizing digital media file-specific information issued by a digital media rights owner when the user has bought a user license. Afterwards the digital media rights owner can read the embedded user fingerprint from the digital media file if it is illegally distributed between other users.

21 Claims, 5 Drawing Sheets

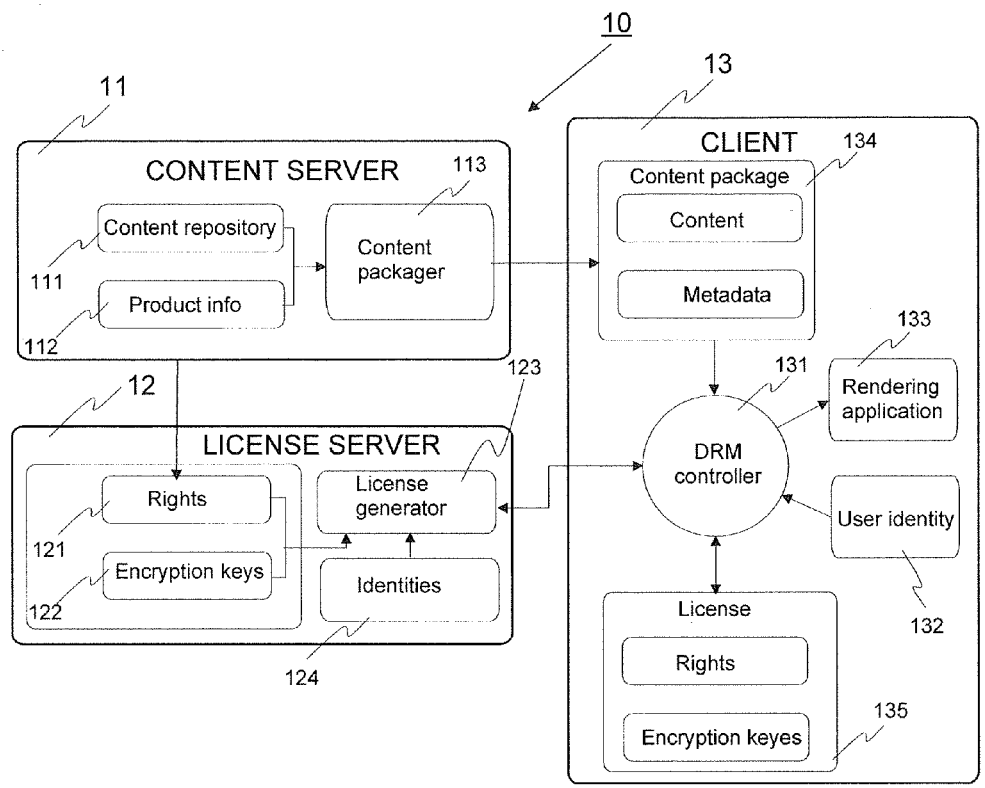
Fig. 1 PRIOR ART: DRM system
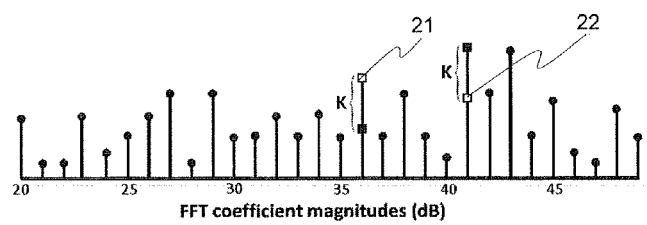
Fig. 2
■ Magnitude of mapped coefficient before watermark embedding
□ Magnitude of mapped coefficient after watermark embedding

METHOD AND SYSTEM EMBEDDING A NON-DETECTABLE FINGERPRINT IN A DIGITAL MEDIA FILE

CROSS REFERENCE TO RELATED APPLICATION

This application is a continuation of International Application No. PCT/FI2009/000014 filed 13 Jan. 2009, the entire contents of all of which are incorporated by reference as if fully set forth.

FIELD OF INVENTION

The invention relates to a method for embedding a non-detectable user fingerprint in a digital media file. The invention also relates to a system delivering digital media files where the embedded watermark can be transformed to a non-detectable fingerprint. The invention also relates to a computer program product implementing the embedding and transformation processes and a computer-readable medium comprising digital media file comprising a watermarked digital media file.

BACKGROUND

One of the enablers for online and mobile music has been digital rights management (DRM). It provides the means for protecting the content ownership and copyrights by restricting unauthorized distribution and usage. However, traditional DRM solutions have proved controversial. Different techniques were tried for preventing the copying of audio CDs, but they caused compatibility problems with so many players that DRM is no longer used in audio CD distribution. In mobile music, there are separate groups of music player manufacturers and online music retailers using different DRM techniques, which are not interoperable. This is not an ideal situation from the consumer perspective, because DRM-protected music purchased from an online music store may be playable in digital audio players of only one manufacturer.

The dominant digital music format is currently MPEG-1 Audio Layer 3 (Motion Picture Experts Group), more commonly known as MP3. It is also the de facto standard encoding of music played on digital audio players. The problem with MP3 regarding mobile music distribution is that it does not support copy protection. This has caused online music retailers to use other DRM-enabled proprietary audio formats. The aim is to make using the music files difficult in ways not specified and allowed by the record companies. Most of the current encryption-based solutions can be circumvented with burning the music to CD and then ripping it back into some unprotected format such as MP3.

Digital watermarking can be used for creating a solution for the rights management problem of digital audio. The nature of watermarking allows the audio to be unencrypted because the content protection is embedded into the audio signal itself. The use of an unprotected file format enables the music to be played on any digital audio player, and the music can also easily be burned to CD as well. This eliminates many of the attacks used on other DRM systems and allows better consumer satisfaction because of wider usability. The problem is, however, that digital watermarks can be vulnerable to signal processing attacks. The watermarked signal can be modified so that the modification is inaudible for a human listener, but the watermark signal may be destroyed in the process. This is a major challenge for all watermarking applications.

System enforcing rights model is called a DRM system 10. One example is depicted in FIG. 1. Although the DRM system architecture depends heavily on the specific usage scenario, there are some common components, which are found on most of the systems. This common theme is called DRM reference architecture. It consists of three major components: the content server 11, the license server 12 and the client 13.

The content server 11 includes a content database 111 for all content files, and the functionality 113 to prepare content for DRM-controlled distribution. In addition to the content itself, the database stores metadata information 112 about the content, such as title, author, format and price. For end users, the content server 11 allows access to the DRM-enabled content downloads.

The content files are usually manipulated in some way in order to prepare them for controlled distribution when they are imported into the content repository 111. This is done by the content packager component of the content server. All files which are brought into the system by the content providers are first processed by the content packager 113 and then placed into the content database for storing. Another important task of the content packager 113 is the specification of rights the content provider wants to allow for the user. Separate rights can be specified for previewing purposes, and several purchasing options can be offered to the user. The content packager 113 can be for example a web interface running on top of the server providing database access for the content providers.

An essential feature of the content packager is batch processing. As content providers generally add plenty of content in a single session, it must be possible to input multiple files with customizable rights models into the system.

The license server 12 in a typical DRM system 10 creates licenses by a license generator 123 for each user from content rights 121, user identities 124 and content encryption keys 122. The rights 121 and possible encryption keys 122 are provided by the content server, and the client provides information about the user identity. As the communications path between the license server and the client is usually insecure, the data transmissions must be protected with public-key cryptography.

In addition to generating and transmitting licenses to the client, the license server 12 is responsible for the financial transaction of the licensing process. The license server uses the identity of the user to fetch the necessary details concerning the transaction, such as credit card or account details. The identity of the user can be created from a username, social security number, or any other piece of information which accurately identifies the user.

The DRM client side application 13 can reside in a variety of platforms. The primary functionality of the client 13 is contained in a DRM controller 131, which can either be an independent piece of software or it can be integrated into the content rendering application itself. The main functions of the DRM controller are to gather identity information 132 from the user, obtain licenses 135 comprising user rights and encryption keys from the license server 12, authorize the rendering application 133 to have access to the content package 134 comprising the content and metadata and perform the possible content decryption. Additionally, the controller delivers the user's commands to the license server for requesting licenses and checking the payment options. The DRM controller must support public-key cryptography for secure data transmission between the client 13 and the license server 12.

The usage authorization scenarios depend on the used rights models of the content. The basic model authorizes the user to have access to the content 134 as many times as possible for a single fee. Other models may give or restrict access to the content temporarily regarding the selected payment options. Another possibility is to restrict the number of renderings with a counter-based solution. Securing the usage counter in the client device remains an implementation problem, especially in cases when the user is not required to be online when accessing the content. Trusted computing and hash-based solutions have been proposed for secure storing of the usage counter.

The most important player in Mobile DRM industry is the Open Mobile Alliance (OMA), which is a standards body developing open standards for the mobile phone industry.

OMA DRM 1.0 was the first industry standard method for protecting mobile content. It was approved in 2004, and it is currently supported in most of the mobile phones in the market. The goal of OMA DRM 1.0 is to follow common DRM practices with conforming to special requirements and characteristics of the mobile domain, while providing basic functionality with some level of security. Version 1.0 provides three methods for content protection and delivery: forward-lock, combined delivery and separate delivery.

In the first DRM revision OMA focused on the fundamental building blocks for a DRM system. The new OMA DRM 2.0 addresses the security issues with new features based on the separate delivery method.

The OMA DRM 2.0 security model relies heavily on the DRM agent of the user device. The content itself is packaged in a similar secure container encrypted with a symmetrical content encryption key, but in addition it utilizes PKI (Public Key Infrastructure) certificates for increased security. Every device with OMA DRM 2.0 support has an individual PKI certificate with a public and a private key. Every rights object is then encrypted with the public key of the receiver before it is sent over the network. The rights object contains the symmetrical key that is used to decrypt the actual content files.

Digital watermarking is a process where information is embedded into a digital host signal, which can be for example a video, an audio, or an image. The watermark can be detectable or non-detectable depending on the application. The idea of using audible removable watermark to protect audio content was presented in M. Löytynoja, N. Cvejic, and T. Seppänen, "Audio scrambling using removable watermarking", *Sixth International Conference on Information, Communications and Signal Processing (ICICS 2007)*, Singapore, 10-13 Dec. 2007.

Digital watermarks have three important characteristics that are determined by the type of application: capacity, robustness and imperceptibility. Capacity is the amount of data that can be embedded in the watermark, robustness is the ability of the watermark to resist modifications to the host signal, and imperceptibility means that the watermark cannot be detected from the host signal with human senses. These characteristics are partially exclusionary, which means that other areas can be emphasized while deteriorating others.

Watermarks can be embedded in audio in time domain or some transform domain, such as the Fourier domain. The selection of domain affects the properties of the watermark concerning imperceptibility and robustness. Frequency domain watermarks are generally considered more inaudible, but they are especially vulnerable against frequency modifications such as pitch shifting or dynamic compression. Time domain watermarking techniques generally use spread spectrum based watermarking. Other domains used for audio watermarking are wavelet domain and cepstrum domain, which is basically the Fourier transform of the decibel spectrum of the signal.

Spread spectrum watermarking means that the power of the watermark information is deliberately spread wider in the frequency domain in order to hide the signal more efficiently in the cover signal. Two types of spread spectrum methods are generally used in digital watermarking: frequency hopping and direct sequence spread spectrum methods. The frequency hopping method is based on fast switching of the carrier frequency according to a pseudorandom sequence, which must be known both in the embedding and extraction phases. The direct sequence method spreads the watermark signal into a wider band signal, also created from a pseudorandom sequence.

In direct sequence spread spectrum watermarking, the watermark signal constructed from pseudorandom sequences can be added to the cover signal by simply adding or subtracting the samples. As the pseudorandom sequence is generally much shorter than the host signal, the sequence is repeated for every block of the host signal. One possible method is to add the pseudorandom signal to the block if the bit to be embedded is one, and subtract if the bit is zero. This kind of approach keeps the computational complexity of the embedding algorithm very low for facilitating real-time usage.

An important usage for direct sequence spread spectrum methods in audio watermarking is synchronization. It is a procedure for determining the exact location of the watermark in the extraction process. The synchronization can be performed either by inserting the synchronization signal once to the beginning of the block sequence or to the beginning of each block.

The synchronization signal is usually a similar pseudorandom spread spectrum signal as in the direct sequence methods, except that the synchronization signal can be much longer. In the extraction process, the synchronization point is calculated by calculating the cross-correlation of the original synchronization signal and the watermarked signal. Separate synchronization signals must be used if the watermark is embedded with the frequency hopping method.

The frequency hopping method is very different by nature than the direct sequence method. Instead of being a wide band signal, the frequency hopping watermark is present at very narrow bands at any given time. The frequency of the signal changes rapidly over time according to a pre-defined pseudorandom sequence. The frequency hopping band defines limits for the hopping sequence. The pseudorandom sequence defining the frequency hopping sequence can be used as the watermark key for securing the exact location of the watermark signal in the frequency coefficients.

An example of the frequency hopping method is presented in FIG. 2. It divides the host audio into blocks of 1024 FFT coefficients and selects two coefficients according to the pseudorandom frequency hopping sequence. The method changes the values of these coefficients to the sub-band mean, which is calculated from the coefficients around the two coefficients. If bit "one" is embedded, the lower coefficient magnitude 21 is set K decibels higher and the higher coefficient 22 is set K decibels lower. If bit "zero" is embedded, the procedure is the opposite. The watermark strength is directly determined by the used K value. Therefore, K cannot be higher than the distance from the sub-band mean value to the frequency masking threshold in order for the watermark to remain below the JND level (Just Noticeable Difference).

SUMMARY

The object of the present invention is to provide a method for embedding a non-detectable digital fingerprint in a digital media file. The digital media file may be an audio file, a video file or a picture file. Also an object of the invention is to provide a delivery system for the fingerprinted digital media files.

The objects of the present invention are fulfilled by providing a method for:

watermarking the digital media file with a detectable watermark;

posting the watermarked digital media;

removing the watermark from the digital media file in a client device by utilizing media file-specific information issued by a digital media right owner; and transforming in the client device the user-detectable watermark to a non-detectable individual user fingerprint in the digital media file during the first use of the digital media file by utilizing the media file-specific information.

Further, the objects of the present invention are fulfilled by providing an arrangement comprising:

a means for watermarking the digital media file with a user-detectable watermark by a digital media right owner;

a means for posting the watermarked digital media file;

in a client device, a means for removing the watermark from the digital media file by utilizing digital media file-specific information issued by a digital media right owner; and further a means in the client device for transforming the user-detectable watermark to a non-detectable individual user fingerprint in the digital media file during the first use of the digital media file by the media file-specific information Still the objects of the present invention are fulfilled by providing a computer-readable medium comprising a digital media file comprising also a user-detectable watermark which is configured to be removed and transformed in a client device to a non-detectable individual user fingerprint during the first use of the digital media file by media file-specific information issued by a digital media right owner.

Also the objects of the present invention are fulfilled by providing a computer program comprising:

computer-readable code for watermarking a digital media file with a user-detectable watermark;

computer-readable code for removing the watermark from the digital media file by utilizing digital media file-specific information issued by a digital media rights owner; and computer-readable code for transforming the user-detectable watermark to a non-detectable individual user fingerprint in the digital media file during the first use of the digital media file by the digital media file-specific information.

The basic idea of the invention is basically as follows: As an example in an audio file the invention may be utilized in the following way. The protection scheme according to the invention combines both the audible removable watermark and robust inaudible fingerprints, which are embedded into the host audio file. First the audio file is embedded with the audible and removable watermark and the file is then posted on the Internet, from where the users are able to download it and possibly to share it to other users.

The users can freely listen to the watermarked audio file, which serves as a teaser to the actual content. The watermark is embedded in a way that it is clearly audible and lowers the audio quality significantly, while at the same time allowing the user to sample what the un-watermarked content would sound like.

If the user likes the song in the audio file, the user may buy the original version simply by downloading the watermarking key which is used to remove the audible watermark from the audio file. The player software according to the invention supports the watermarking method used, in order to be able to remove the audible watermark while playing the content to the user for the first time.

When a noise signal (i.e. the audible watermark) is removed from the preview file, user's individual fingerprint is advantageously added to the content of the audio file. This individual user's fingerprint can advantageously be used later on to find out who is responsible of leaking the content of the audio file to illegal distribution.

Further scope of applicability of the present invention will become apparent from the detailed description given hereafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and accompanying drawings which are given by way of illustration only, and thus do not limit the present invention and wherein FIG. 1 shows schematically a representation of a DRM delivery known in the prior art;

FIG. 2 shows an example of an audible watermark embedded in an audio file by using frequency hopping method;

DETAILED DESCRIPTION OF THE PREFERRED EMBODIMENTS

In the following description, considered embodiments are merely exemplary, and one skilled in the art may find other ways to implement the invention. Although the specification may refer to "an", "one" or "some" embodiment(s) in several locations, this does not necessarily mean that each such reference is made to the same embodiment(s), or that the feature only applies to a single embodiment. Single feature of different embodiments may also be combined to provide other embodiments.

FIGS. 1 and 2 were discussed in conjunction with the description of the prior art.

Figure 3:
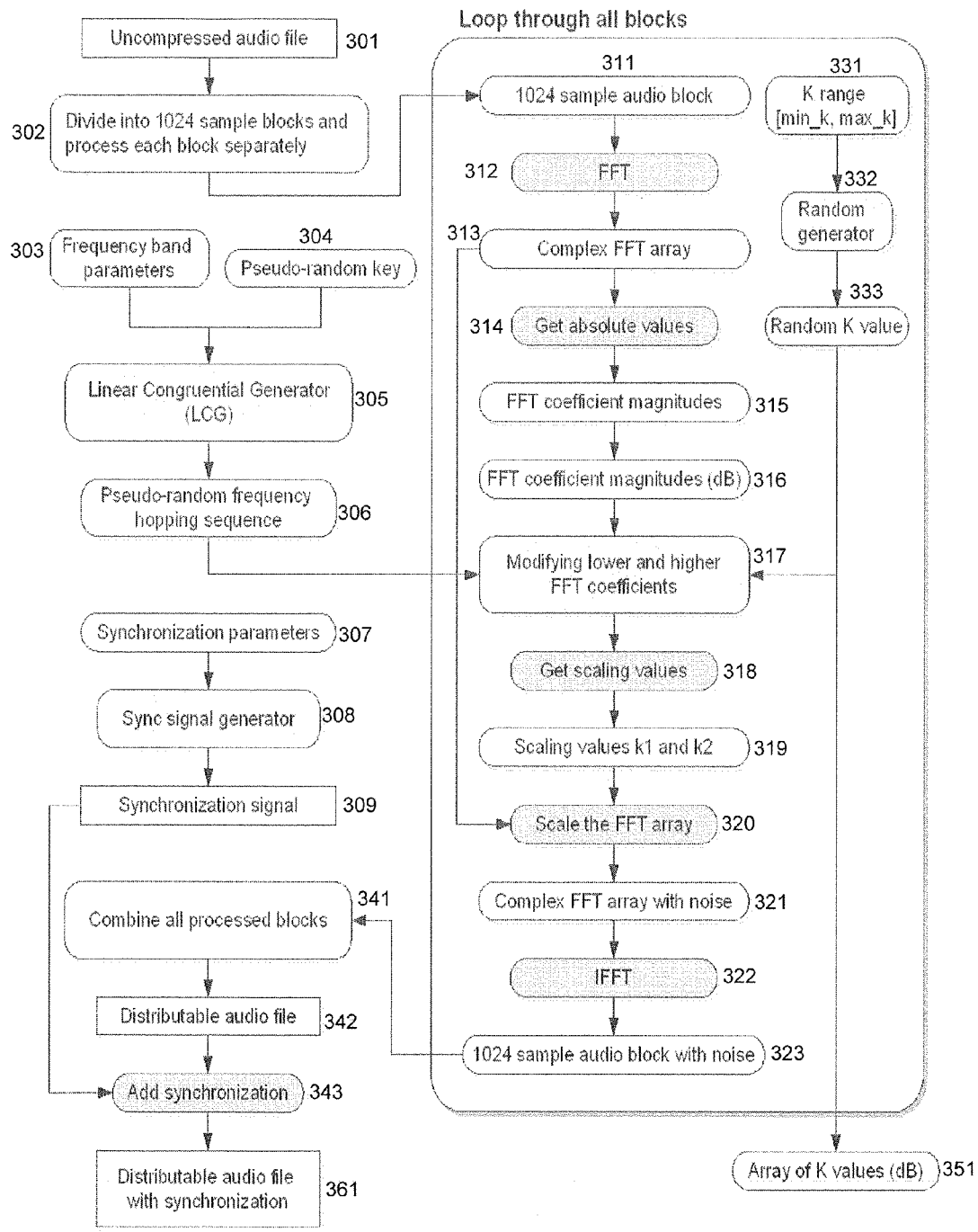
FIG. 3 shows as an exemplary flow chart the main stages of the method according to the invention when a watermarked audio file is created in a content server.
Figure 4:
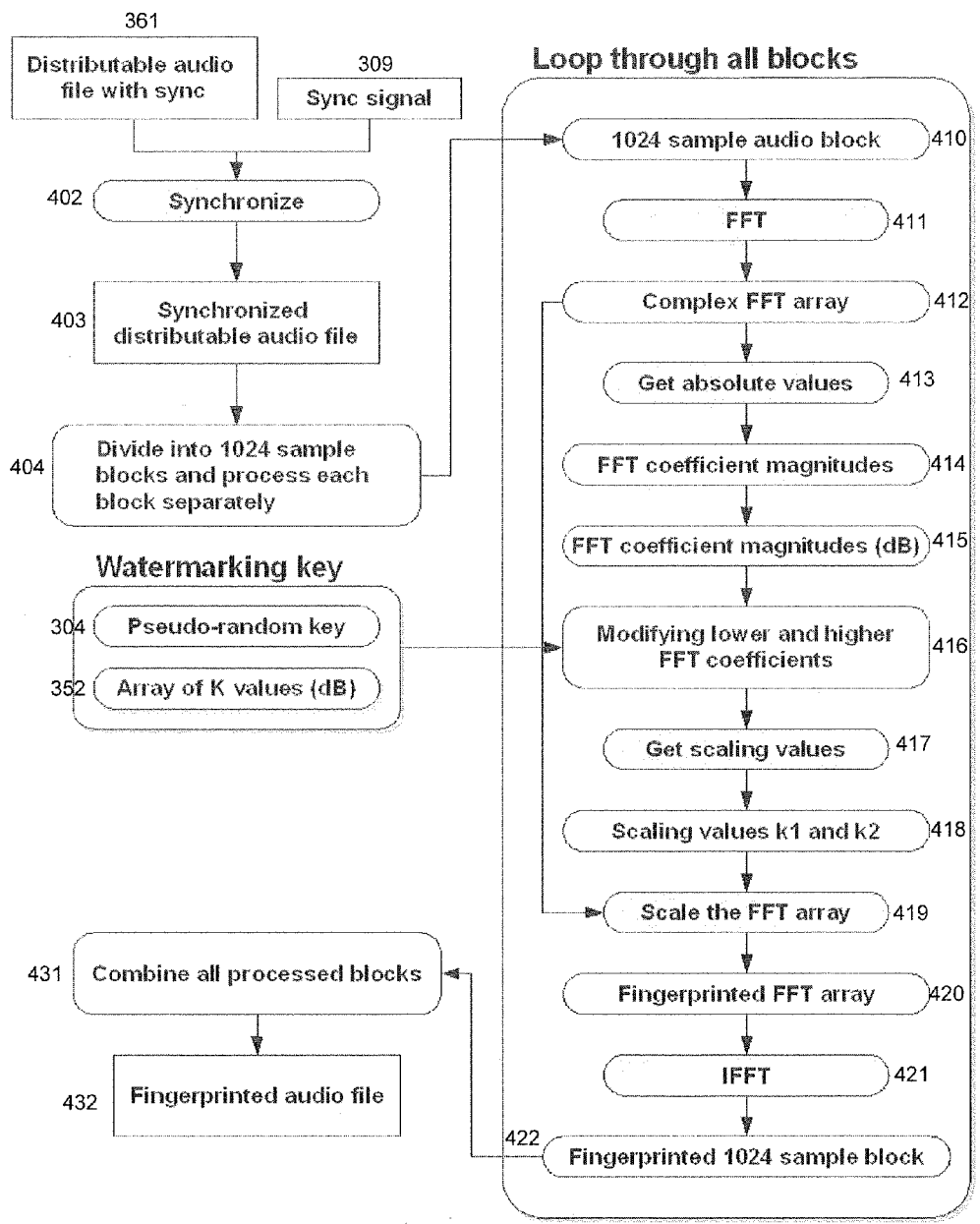
FIG. 4 shows as an exemplary flow chart the main stages of the method according to the invention when a fingerprinted audio file is created in a client application.
Figure 5:
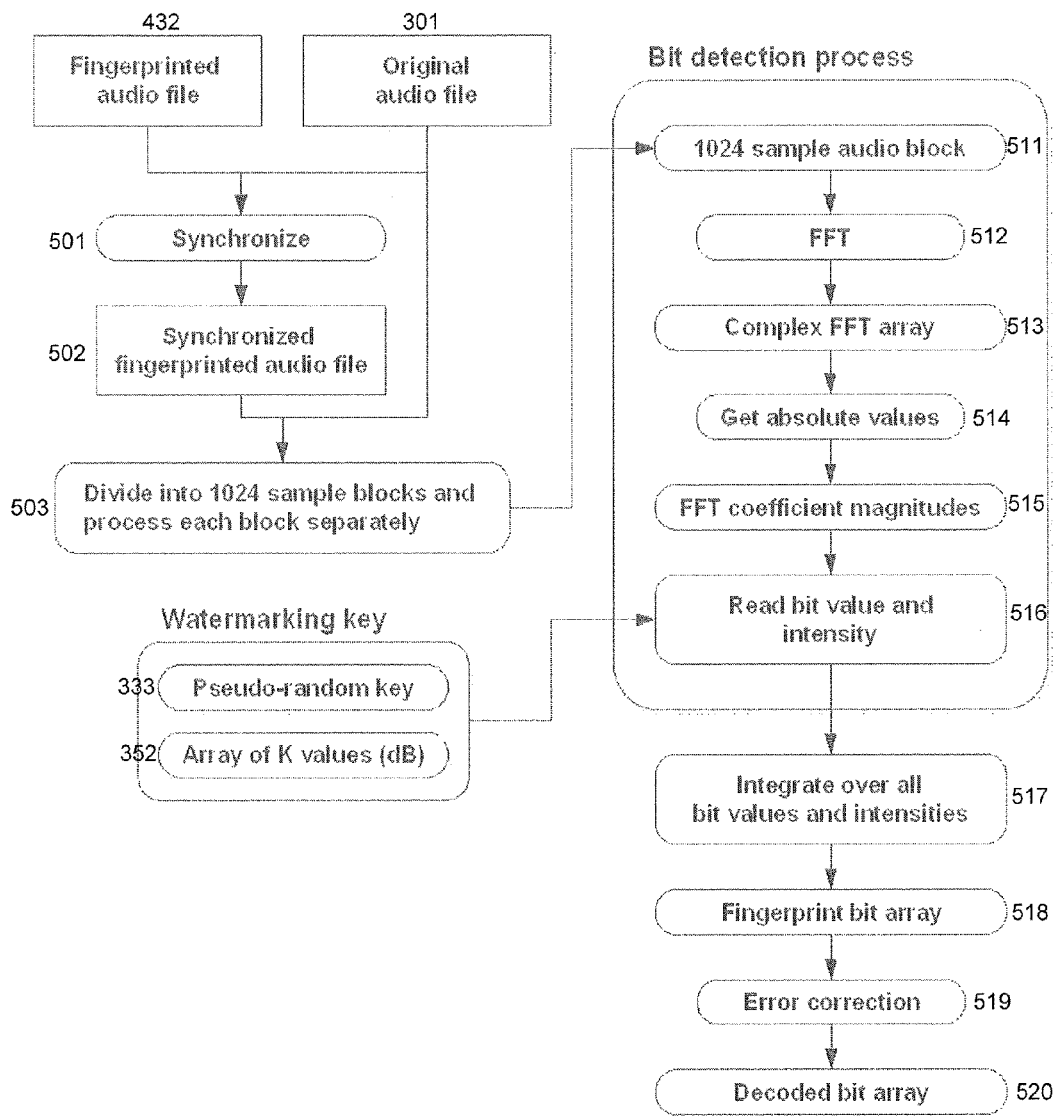
FIG. 5 shows as an exemplary flow chart the main stages of the method according to the invention for finding out a source of an illegal distribution of an audio file.

The fingerprinting algorithm of the present invention may be divided into three main phases: embedding, noise transformation and fingerprint detection. FIG. 3 depicts the embedding phase, FIG. 4 depicts the noise transform phase (i.e. removing a detectable watermark and inserting a non-detectable user fingerprint) and FIG. 5 depicts how a rights owner can find out who is illegally distributing an audio file.

The main steps of the method for embedding a detectable watermark in an audio file are depicted in an exemplary flow chart of FIG. 3. In the embedding phase, a removable watermark is inserted into the original audio in order to produce the distributable preview version. The embedding algorithm may combine several digital watermarking techniques, such as frequency hopping and direct sequence spread spectrum watermarking.

Inputs of the process are the uncompressed original audio file 301 and the pseudo-random key 304 for improving the security of the watermark. At first, the original file 301 is divided into blocks of 1024 samples, step 302, and each block is processed separately from here on. One audio block sample comprising 1024 samples is depicted by reference 311.

A Fast Fourier Transform 312 is accomplished for the audio block 311 in question. The FFT 312 gives an array of complex FFT coefficients 313. By taking absolute values 314 of the complex FFT coefficients absolute magnitudes 315 of the FFT coefficients can advantageously be expressed also in decibels 316.

An embedding of a watermark 317 may advantageously be made by modifying advantageously two frequency coefficients of the audio file sample which may be defined by a pseudo-random frequency hopping sequence 306. The pseudo-random hopping sequence is accomplished by a Linear Congruential Generator (LCG) 305 which uses as inputs frequency band parameters 303 and pseudo-random key 304. The pseudo-random frequency hopping frequency band may comprise for example 512 frequency coefficients.

A modified frequency coefficient pair may be advantageously selected to be five coefficients higher than the coefficient selected by the frequency hopping sequence. The lower coefficient may be modified with a −K modifier and the higher coefficient may be modified with a +(K/2) modifier. The value of K is advantageously the value of the random K value 333.

For modifying the magnitudes of the extracted FFT coefficients 316 a random K value, reference 333, is selected using a random generator 332 from a range [min_k, max_k], reference 331, with steps of 0.1. This parameter defines the amount of noise in dB to be advantageously added into a current audio block. A different random K value 333 is used for each audio block. The used K values may be advantageously stored for later use in a specific array 351.

Using the random value K 333 and the FFT coefficients selected by the pseudo-random frequency hopping sequence 306 actual scaling values for the audio block in question may be defined in phase 318. The actual values of the scaling values $k_1$ and $k_2$ depend on the random value K of the audio sample, reference 333.

In step 320 the defined scaling values $k_1$ and $k_2$, reference 319, are used to modify the two defined FFT coefficients of the original complex FFT array 313. The two defined coefficients in the complex FFT array are scaled according to the defined scaling values $k_1$ and $k_2$ in order to produce a complex FFT array 321 with added detectable noise. The modified FFT array 321 is similar to the depicted example in FIG. 2 where two FFT coefficients, numbers 36 and 41 from 512 FFT coefficients, are transformed for adding a watermark in an audio sample.

The noisy watermarked audio block is then transformed to time domain by using IFFT (Inverse Fast Fourier Transform) in step 322. The result is an audio block 323 in time domain which comprises an audio file with a detectable noise signal.

Steps 311-333 are repeated for all audio blocks which each comprise 1024 samples. The used random value K 333 and pseudo-random hopping sequence 306 may be changed after each processed audio block. This means that the places of the noisy FFT coefficients are not the same in all audio blocks and that the scaling values $k_1$ and $k_2$ may also vary from an audio sample to an audio sample.

In step 341 all modified audio blocks are put together and a final level scaling is made for the whole audio file to avoid clipping issues. The result is a distributable audio file 342.

The final step 343 is to add a spread spectrum synchronization signal 309 by a sync signal generator 308. The sync signal generator 308 builds a synchronization signal 309 using defined synchronization parameters 307. The synchronization signal 309 is advantageously embedded in the beginning of the block sequence to facilitate the synchronization process in the phase where the noise is removed from the audio file. The synchronization signal 309 may be added to the beginning of each audio sample or use only one synchronization signal in the beginning of the audio file 342. For example a spread spectrum signal of 16 384 samples limited to a frequency band of 10-20 kHz may be used as a synchronization signal. It may be embedded to the beginning of the audio signal with a strength of 0.03.

The watermarking process ends in a step where an audio file 361 with a watermark is ready for posting on the Internet. For removing the noise later (i.e. the watermark), the pseudo-random key 304 and the defined changes of the FFT coefficients in dB (an array of K values 351) must be stored. These parameters form the watermarking key for the audio file. In addition, the used spread spectrum synchronization signal 309 must be stored.

FIG. 4 depicts the noise transform phase of the present invention. The noise transformation phase comprises transforming a detectable watermark of the audio file to a non-detectable user fingerprint. The main steps of the method for transforming a detectable watermark to a non-detectable fingerprint in an audio file are depicted in an exemplary flow chart of FIG. 4. A transformation from a watermark to user fingerprint can be accomplished in an electrical apparatus of several kinds. The invention can be accomplished in any kind of apparatus which comprises a processor unit and enough memory for saving a computer program utilized in the transformation. The apparatus may be for example a computer, a cellular phone, a digital personal assistant (PDA), a digital television receiver, a digital radio receiver, an MP3 player, etc.

The required parameters for creating a license for a user and modifying the distributable watermarked audio file into a uniquely fingerprinted audio file are: unique pseudo-random key of the audio file 304, frequency band 303 for the watermark noise (for example frequency band 1-512 of FIG. 2), an array of dB changes made in the audio file 351 during watermarking, intended fingerprint strength in dB, user id of the buyer and synchronization signal 309 and its scale.

The pseudo-random key 333 and frequency band parameters 303 must have the same values that were used in adding the watermark in the audio file. The dB changes array 351 is also brought from the data stored in the watermark adding operation. The fingerprint strength determines directly the quality of the resulting audio file. It is the amount of noise left in the song after removing the watermark noise of the distributable sample. This leftover noise forms the individual user fingerprint, which contains the user id of the buyer in the system.

When the user contacts a music store server, it must first identify itself with a unique user id. This user id is then during the noise transform encoded to the dB changes array (an array of K values) of the fingerprinted audio file.

The fingerprint embedding may be done by increasing or decreasing scaling values $k_1$ and $k_2$ used in the watermarking of the audio file. The fingerprint strength parameter defines the amount how much the dB values are changed. In one advantageous embodiment of the invention the dB values are increased if the embedded bit is "one", and decreased if the bit is "zero".

A forward error correction may be used before embedding the fingerprint for increased reliability. In addition to the dB changes array, the pseudo-random key of audio file is added to the license data. These two elements form the unique user's license.

The transformation process can be divided into three main steps: synchronization, block processing and combining the result audio. The watermarked audio signal must be synchronized before the noise can be removed from it. The synchronization is done by taking a cross-correlation between the audio and the original synchronization signal. The maximum value of the correlation is the synchronization offset. After the synchronization offset has been found, the synchronization signal is not needed anymore, and it may be removed from the audio signal. It may be removed by subtracting the scaled original synchronization signal from the synchronization offset point in the distributable audio file 361.

Synchronization determines also the starting point of the watermarking sequence. The synchronization method may utilize direct sequence spread spectrum watermarking techniques. Synchronization may be needed because different lossy compression encoders, for example MP3 encoding, may add some additional samples to the beginning of the audio file in the encoding phase. The synchronization signal is advantageously removed from the audio file after the starting point has been located in order to achieve higher audio quality.

In the synchronization, step 402, a client application synchronizes a watermarked audio file using a synch signal 309. The result is a synchronized audio file 403. The synchronized audio file may be divided into audio blocks of 1024 samples. Each audio block is advantageously processed separately.

The frequency hopping sequence is generated from the pseudo-random initialization key 304. The sequence is limited with the same parameters as used in the watermarking. The resulting sequence is equal to the sequence generated in watermark embedding process of FIG. 3.

The synchronized audio is divided into 1024 sample blocks 410 starting from the synchronization offset point. Each audio block 410 is advantageously processed separately from here on. An FFT process 411 transforms the audio sample into a complex FFT array 412. Absolute values of each FFT coefficient are then taken in step 413. This process results magnitudes 414 of the FFT coefficients. The magnitudes of the FFT coefficients are transformed to dB in step 415.

Then the K value for the current audio block is read from the dB changes array 352. The array 352 comprises modified versions of the array of K values 351 used in the watermarking. This array element 352 contains advantageously modified scaling values $k_1$ and $k_2$. By utilizing these modified scaling values the watermarking noise is advantageously transformed to a user fingerprint.

Then the K value for the current audio block is read from the dB changes array 351. This array element contains the modifications made to the respective block of the original audio, which result the watermarking noise.

In steps 416-419 the watermarking noise is removed by first modifying those FFT coefficient magnitudes in decibel domain which were used in the watermarking of the audio sample. After that the same FFT coefficients are modified with new scaling values which cause less noise than those used in the watermarking. The new scaling values do not leave audible noise in the audio file. The new scaling values of fingerprinting are also modified to contain the fingerprint of the user.

Figure 6:
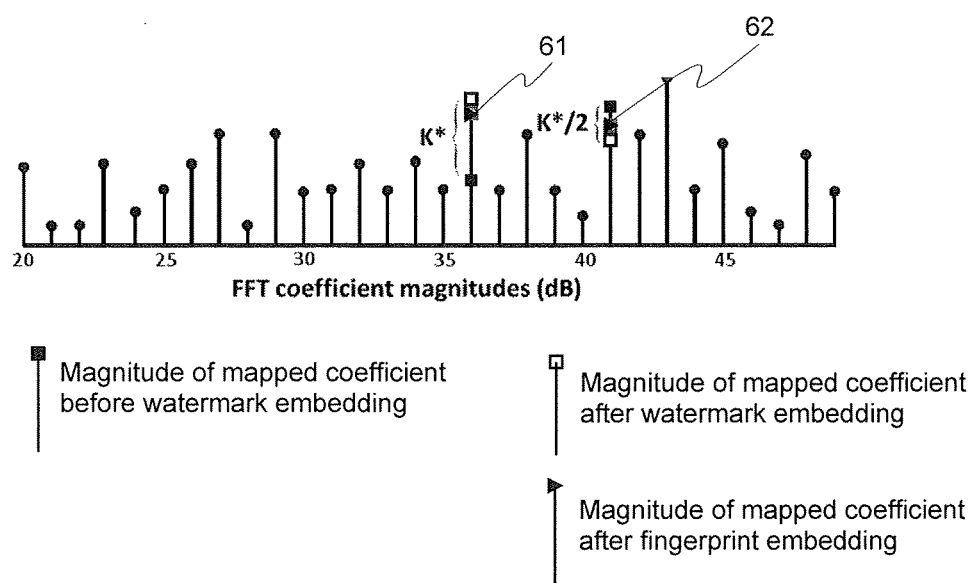
FIG. 6 shows an example of a non-audible fingerprint embedded in an audio file by using frequency hopping method.

FIG. 6 depicts an example of an audio block where FFT coefficients 36 and 41 are transferred from watermark to a fingerprint. The differences between the original FFT coefficients of the audio sample and the fingerprinted audio sample, references 61 and 62, are smaller than the differences of the original FFT coefficients of the audio sample and the watermarked audio sample.

In step 421 an IFFT is accomplished to the fingerprinted FFT array 420. The transform results a fingerprinted audio block of 1024 samples. The audio block 422 is then concatenated to the other audio blocks of the same audio file.

Each audio block of the audio file is advantageously processed separately. When all audio blocks of the audio file are transformed, a fingerprinted audio file 432 is ready for listening.

The actual noise transformation from noise into a fingerprint is done when the FFT coefficients are modified with the K array values 352. It is possible because the K array values are not exactly the same in the fingerprinting phase compared to the values which were stored in the server in the watermark embedding phase. They are modified slightly by the server in a way that the K array values contain a non-detectable digital fingerprint of the user. The id of the user in the music store can be used as the fingerprint data. This means that a unique K array must be generated by the server every time a new customer purchases a license for an audio file, because of different fingerprint data.

One advantage of this kind of process is that the audio file is never in an unprotected state, because it transforms directly from the free watermarked preview version into the fingerprinted user version without any additional steps in between. It is also convenient for the user because he does not have to download the song again after purchasing. Instead, he only needs to acquire the license and wait for the local noise transform process to be completed.

The main steps of the method for reading a fingerprint from an audio file are depicted in an exemplary flow chart of FIG. 5.

Before reading a fingerprint of an audio file the audio file must be identified. After that a correct pseudo-random key K can be extracted from the array of K values 351.

Synchronizing 501 of the fingerprinted audio file 432 can be done against an original audio file 301. A cross-correlation is calculated between the fingerprinted audio signal and the original audio signal. The maximum value of the correlation is the synchronization offset. If the fingerprinted audio file has any extra samples in the beginning, they are cropped away so that the original and the fingerprinted audio are in synchronization when digital rights owner starts reading them both at the first sample.

The pseudo-random hopping sequence used in modification of the FFT coefficients is generated at first from the pseudo-random initialization key 333 and the frequency band parameters 303.

Then both the synchronized fingerprinted audio file 502 and the original audio file 301 are divided into blocks comprising 1024 audio samples (references 503 and 511). The blocks are transformed 512 with FFT which results a complex FFT array 513. The FFT coefficient magnitudes are calculated with taking the absolute values 514 of the complex FFT coefficients. The FFT magnitudes are then advantageously transformed to dB domain, reference 515.

Reading the fingerprint may be done by comparing the FFT coefficient pairs of the original audio file 301 and the fingerprinted audio file 432, step 516. The lower FFT coefficient of the pair is read from the frequency hopping sequence and the higher coefficient is advantageously five coefficients higher.

Integration over all bit values and intensities in step 517 may be accomplished in the following way. Two comparison values may advantageously be calculated from these FFT pairs. The first value is a lower FFT coefficient magnitude of the fingerprinted audio file subtracted with a lower FFT coefficient magnitude of the original audio file. The second value is a higher FFT coefficient magnitude of the fingerprinted audio file subtracted with a higher FFT coefficient magnitude of the original audio file. The extracted fingerprint bit from this block of 1024 samples is 1 if the first value is greater than the second value and 0 if the second value is greater than the first value. This process is repeated with all corresponding audio blocks of 1024 samples of the fingerprinted audio file and the original audio file.

The resulting fingerprint bit array 518 is divided into blocks of the size of the utilized forward error correction block 519. For example, if the simplest Hamming code (7, 4) is used, the block size is 7. After decoding, the error-corrected bit array is advantageously divided into blocks of 32 bits. These blocks are the actual fingerprint bit arrays 520 which present the user id. If additional error correction is required, the large number of fingerprints allows us to select the most common fingerprint bit array either bit-by-bit or word-by-word.

Although the fingerprinting method in FIGS. 3, 4 and 5 is depicted in context of an audio file, it is evident to a man skilled in the art that the invention may be used also in the context of a video file or a picture file.

Any of the process steps described or illustrated above may be implemented using executable instructions in a general-purpose or special-purpose processor and stored on a computer-readable storage medium (e.g. disk, memory, or the like) to be executed by such a processor. References to 'computer-readable storage medium' and 'computer' should be understood to encompass specialized circuits such as field-programmable gate arrays, application-specific integrated circuits (ASICs), USB flash drives, signal processing devices, and other devices.

The invention being thus described, it will be obvious that the same may be varied in many ways. For example more frequency coefficients than the depicted example of two frequency coefficients can be utilized in the watermarking and fingerprinting. The invention may also be accomplished by utilizing direct sequence spread spectrum watermarking method instead of frequency hopping watermarking method. Such variations are not to be regarded as a departure from the spirit and scope of the invention, and all such modifications as would be obvious to one skilled in the art are intended to be included within the scope of the following claims.

What is claimed is:

1. A method for inserting a non-human sense detectable user fingerprint in a digital media file the method comprising:
   watermarking the digital media file with a human sense detectable watermark wherein the watermarking is accomplished by utilizing frequency hopping watermarking technique wherein in the watermarking at least two frequency coefficients are modified to generate human senses detectable noise in the digital media file;
   posting the watermarked digital media file to a user; and
   removing the human sense detectable watermark from the digital media file in a client device by utilizing media file-specific information issued by a digital media right owner by transforming the human sense detectable watermark to a non-human sense detectable individual user fingerprint in the digital media file wherein the non-human sense detectable individual user fingerprint is accomplished by transforming the at least two frequency coefficients in the watermarking during the first use of the digital media file by utilizing the digital media file-specific information.

2. The method according to claim 1, wherein a starting point of a watermark or a fingerprint is embedded in the digital media file utilizing a spread spectrum signal.

3. The method according to claim 1, wherein the digital media file-specific information comprises a pseudo-random key defining utilized frequency components, an array of a random variable K defining a scaling strength of the utilized frequency components in fingerprinting and a synchronization signal information.

4. The method according to claim 1 wherein the digital media file is one of the following: an audio file, a video file or a picture file.

5. The method according to claim 1, wherein the watermarking and fingerprinting is accomplished by direct sequence spread spectrum technique.

6. An arrangement for fingerprinting a digital media file comprising:
   a content server:
      configured to watermark the digital media file with a human sense detectable watermark by a digital media right owner;
      posting the watermarked digital media file; and
   a client device configured to remove the human sense detectable watermark from the digital media file by transforming the human sense detectable watermark to a non-human sense detectable individual user fingerprint by utilizing at least two frequency coefficients in the watermarking configured to be transformed to a non-human sense detectable user fingerprint in the digital media file during the first use of the digital media file by utilizing the digital media file-specific information issued by the digital media right owner.

7. The arrangement according to claim 6, wherein the watermarking and fingerprinting is configured to be accomplished by frequency hopping watermarking.

8. The arrangement according to claim 6, wherein a starting point of a watermark or a fingerprint is configured to be embedded in the digital media file by a spread spectrum signal.

9. The arrangement according to claim 7, wherein in the watermarking at least two frequency coefficients are configured to be modified for generating human sense detectable noise in the digital media file.

10. The arrangement according to claim 6, wherein the digital media file-specific information comprises a pseudo-random key defining utilized frequency components, an array of a random variable K defining a scaling strength of the utilized frequency components in fingerprinting and a synchronization signal information.

11. The arrangement according to claim 6, wherein the digital media file is one of the following: an audio file, a video file or a picture file.

12. The arrangement according to claim 6, wherein the watermarking and fingerprinting is configured to be accomplished by direct sequence spread spectrum technique.

13. The arrangement according to claim 6, wherein the client device is one of the following: a personal computer, a cellular phone, a digital personal assistant (PDA), a digital television receiver, a digital radio receiver or an MP3 player.

14. A non-transitory computer readable medium comprising a digital media file comprising also a human sense detectable watermark that is configured to be is transformed in a client device to a non-human sense detectable individual user fingerprint during the first use of the digital media file by utilizing a digital media file-specific information including a pseudo-random key defining utilized frequency coefficients, an array of a random variable defining a scaling strength of the utilized frequency coefficients in fingerprinting and a synchronization signal information and issued by a digital media right owner.

15. The non-transitory computer readable medium according to claim 14, wherein the watermarking is accomplished by frequency hopping watermarking.

16. The non-transitory computer readable medium according to claim 14, wherein a starting point of the watermark is embedded in the digital media file in a spread spectrum signal.

17. The non-transitory computer readable medium according to claim 15, wherein in the watermarking at least two frequency coefficients are modified for generating human sense detectable noise in the digital media file.

18. The non-transitory computer readable medium according to claim 16, wherein the digital media file (361) is one of the following: an audio file, a video file or a picture file.

19. The non-transitory computer readable medium according to claim 14, wherein the watermarking and fingerprinting is accomplished by direct sequence spread spectrum technique.

20. A computer program on a non-transitory computer readable medium comprising:

computer readable code for:

watermarking a digital media file with a human sense detectable watermark by modifying at least two frequency coefficients in the watermarking to generate human sense detectable noise in the digital media file; and removing the human sense detectable watermark from the digital media file by transforming the human sense detectable watermark to a non-human sense detectable individual user fingerprint in the digital media file by utilizing the at least two modified frequency coefficients in the watermarking during the first use of the digital media file by utilizing a digital media file-specific information issued by a digital media right owner.

21. The computer program on a non-transitory computer readable medium according to claim 20, wherein it further comprises computer readable code for utilizing in the watermarking and fingerprinting direct sequence spread spectrum technique.

* * * * *

UNITED STATES PATENT AND TRADEMARK OFFICE
CERTIFICATE OF CORRECTION

| | | |
|---|---|---|
| PATENT NO. | : 8,499,159 B2 | Page 1 of 1 |
| APPLICATION NO. | : 13/180930 | |
| DATED | : July 30, 2013 | |
| INVENTOR(S) | : Löytynoja et al. | |

It is certified that error appears in the above-identified patent and that said Letters Patent is hereby corrected as shown below:

Title Page, Item (75), under Inventors, in column 1, for the following inventors, Marko Brockman, Jukka Koutaniemi, and Eero Seppänen, delete "Oulu (SE)" and insert -- Oulu (FI) --, therefor.

Signed and Sealed this
Twenty-fifth Day of February, 2014

Michelle K. Lee
*Deputy Director of the United States Patent and Trademark Office*